United States Patent [19]

Silver et al.

[11] Patent Number: 4,585,407
[45] Date of Patent: Apr. 29, 1986

[54] GUIDE FOR ELECTRIC CABLE INSULATION EXTRUSION HEAD

[75] Inventors: David A. Silver, Livingston; John C. Rowland, Westfield, both of N.J.

[73] Assignee: Pirelli Cable Corporation, Union, N.J.

[21] Appl. No.: 538,590

[22] Filed: Oct. 3, 1983

[51] Int. Cl.[4] .................. B29C 47/02; B29C 47/04
[52] U.S. Cl. ................................ 425/114; 264/174; 425/133.1
[58] Field of Search ............... 425/113, 114, 131.1, 425/133.1, 133.5, 461; 264/173, 209.1, 169, 300, 174

[56] References Cited

U.S. PATENT DOCUMENTS

| | | | |
|---|---|---|---|
| 3,581,343 | 6/1971 | Henrikson et al. | 425/113 |
| 3,649,730 | 3/1972 | Benteller et al. | 425/113 |
| 3,820,927 | 6/1974 | Toomajanian | 425/113 |
| 3,895,899 | 7/1975 | Weber et al. | 425/461 |
| 4,303,734 | 12/1981 | Sullivan | 425/113 |
| 4,305,900 | 12/1981 | Cavalli | 425/113 |
| 4,309,160 | 1/1982 | Poutanen et al. | 425/113 |
| 4,354,989 | 10/1982 | Beach | 425/113 |
| 4,362,488 | 12/1982 | Casels et al. | 425/113 |
| 4,435,348 | 3/1984 | Standley | 425/113 |
| 4,455,133 | 6/1984 | Jakob et al. | 425/113 |

OTHER PUBLICATIONS

"Properties of Centerflex Technical Ceramic", Centerflex Tech. Corp. brochure.
"Criteria for Determining Performance in Service of Crosslinked Polyethylene Insulated Power Cables", 11-21-75, pp. 1-9, Bahder et al.
Machinery's Handbook, 1979, Oberg et al., pp. 21-28-2-1-33.
Metal's Handbook, 6th Ed., vol. 2, Heat Treating, Cleaning and Finishing.

Primary Examiner—Jay H. Woo
Assistant Examiner—Timothy W. Heitbrink
Attorney, Agent, or Firm—Brooks Haidt Haffner & Delahunty

[57] ABSTRACT

Apparatus for extruding a first layer of a semi-conductive plastic material around the conductor of an electric power cable and for extruding a second layer of plastic insulating material around the first layer as the conductor is advanced in which the extruder for the insulating material includes an extrusion head which comprises a body with a passageway therethrough for the passage of the conductor through the body and having at least one channel therein extending from the exterior thereof to adjacent one end of the passageway for supplying the insulated material around the conductor. An extrusion tip or tubular guide is disposed in the passageway for guiding said conductor and extends across part of the channel for contacting material exiting from the channel. The guide comprises a ceramic tube with a polished inner surface forming the innermost surface of the guide.

18 Claims, 3 Drawing Figures

GUIDE FOR ELECTRIC CABLE INSULATION EXTRUSION HEAD

This invention relates to apparatus including extrusion heads for the extrusion of layers of semi-conducting material and of insulating material around the conductor of an electric cable.

In the manufacture of high voltage power cable, it is necessary to cover the solid, or multi-strand, conductor with a thin layer (15 to 25 mils thick) of a semi-conductive polymeric compound in order to provide a smooth inner cylindrical electrode which adheres to the insulating layer of material extruded thereover as a fundamental part of the dielectric system. Any imperfections, such as ridges, scuffed areas or abrasions of the outer surface of this electrode will significantly reduce the electrical strength of the system by causing high electrical stress in the insulation which is extruded over this semi-conductive cylinder which acts as a conductor screen or shielding. Similarly, when two layers of materials of other different electrical properties are extruded, one over the other, it is desirable to avoid such imperfections.

In tandem extrusion, which is conventional in the art, the semi-conductive layer is extruded over the conductor and allowed to partially cool in air prior to entering the insulation layer extruder to prevent distortion thereof when it is guided into the second extruder. The guiding is done by a guide or tip which has to be concentrically aligned with the die which forms the insulating layer. A portion of the outside of the guiding tip becomes the surface over which the molten insulation compound flows to form the insulation layer being extruded.

Conventionally, the material of the tip is steel and has a relative high thermal conductivity. This permits the conductor with the semi-conductive layer thereon to drain heat from the tip at multiple contact points. This in turn affects the flow of hot polymeric insulation material, causing a change in viscosity resulting in turbulence or uneven flow. The resulting disruption to the interface of the insulation material with the semi-conductive layer causes localized high electrical stresses as described above. In addition, a steel tip is subject to wear which causes grooves to form which, in turn, will adversely affect the smoothness of the surface of the semi-conductive layer in contact with the insulation. Also the coefficient of friction of a steel tip is sufficient to permit drag forces which affect the surface of the semi-conductive layer.

It is one object of the invention to provide an improved guide or tip for an extrusion head used for the extrusion of materials around a conductor for an electric cable and particularly, an electric cable for high voltage use.

It is a further object of the invention to provide a guide or tip for an extrusion head used for extruding a layer of insulating material over a layer of another material, such as a semi-conductive material, on a conductor in such a manner that the voltage breakdown characteristics of the resulting cable are improved as compared to cables produced by extrusion of such layers over the conductor and each other with the use of prior art extrusion heads.

In accordance with the preferred embodiment of the invention, the extrusion head used for extruding a layer of insulating material over a layer of material already applied to the conductor is provided with a polished, fired ceramic guide, in tubular form, at a position in the head where the guide is between the layer of material already applied to the conductor and the material being extruded over the layer already applied and where the already applied layer is in contact substantially only with the interior of the guide. Preferably, also, the guide is a single, unitary tube of ceramic but in a less preferred embodiment, the guide comprises an inner tube of ceramic and an outer shell of metal. If desired, the extrusion head for extruding the first layer of material onto the conductor itself may have a similar guide suitably modified in dimensions.

Other objects and advantages of the present invention will be apparent from the following detailed description of the presently preferred embodiments thereof, which description should be considered in conjunction with the accompanying drawings in which.

The guide or tip, forming part of the invention, may be used with known types of extrusion heads and in known processes for extruding plastic materials successively over the conductor of an electric power cable. The invention will be described in connection with one prior art type of extrusion head shown schematically.

Figure 1:
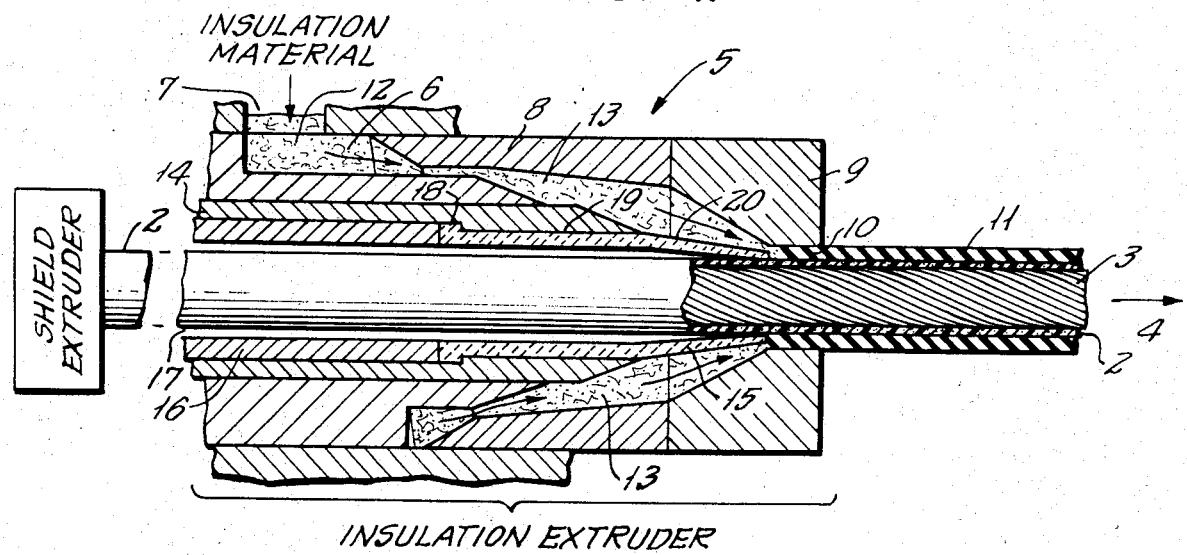
FIG. 1 is a schematic, axial cross-section of an extrusion head with the preferred guide, or tip, of the invention therein in association with an extruder for extruding a first layer of semi-conductive material on a conductor.

With the apparatus illustrated in FIG. 1, a shield extruder 1 extrudes a layer 2 of a semi-conductive material, such as polyethylene containing carbon black in an amount sufficient to make it semi-conductive, around the cable conductor 3 as it is advanced in the direction of the arrow 4. The extruder 1 normally contains an extrusion head which may be of a construction substantially the same as the extrusion head described hereinbefore. The conductor 3 may be a solid wire but normally will be constituted by a plurality of stranded wires as shown in FIG. 1. The layer 2 may, for example, have a thickness of the order of 15 to 25 mils.

The conductor 3 with the layer 2 thereon is advanced into and through an extrusion head 5 of a known type, except for the guide described hereinafter, and forming part of a conventional extruder which supplies insulation material 6, in hot, plastic form, to the inlet 7 in the body 8 of the head 5. The insulation material 6 may be, for example, polyethylene.

A die 9 having an opening 10, for determining the outer size of the layer of insulating material 11, is secured to the body 8 in a conventional manner. The body 8 has a channel formed by the channel 12 and the annular channel 13 which extends from the inlet 7 to the die opening 10 and hence, from the exterior of the body 8 to the die opening 10.

The body 8 has a tubular insert 14 secured in a fixed position in the body 8 in a conventional manner, such as by a press fit, which receives a tubular guide or tip 15 and another tubular insert 16 which bears against the rear of the guide 15 and which is held in place in any conventional manner, both the insert 16 and the guide 15 being removable. The insert 16 and the guide 15 define a passageway 17 for the passage of the conductor 3, with the layer 2 thereon, through the body 8.

The guide 15 has a flange 18 which bears against the end of an enlarged portion of the bore of the insert 14 and has a cylindrical outer surface portion 19 which engages the smaller diameter portion of the bore of the insert 14 and terminates at the end of the insert 14 as shown. The guide 15 has a frustoconical outer surface portion 20 which extends partly across the exit end of the channel 13 so that as the material 12 flows from the channel 13 to the die opening 10 and around the semiconductive layer 2, the material contacts and flows over the surface portion 20.

The diameter of the interior wall of the insert 16 is selected so that is is larger than the exterior diameter of the layer 2. For example, if the exterior diameter of the layer 2 is about 1.2 inches, the diameter of the interior wall of the insert 16 may be 1.5 inches. Since the conductor 3 is under tension, it will remain substantially linear within the bores of the insert 16 and the guide 15 and will have little, if any, contact with the interior wall of the insert 16. Also, prior to reaching the exit end of the guide 15, the layer 2 will have little contact with the interior wall of the guide 15, but if it does, it will not be disturbed significantly or cause significant drag because of the properties of such interior wall described hereinafter. Of course, to reduce contact with the interior wall of the insert 16, the bore of the insert 16 may, if desired, be made larger in diameter than the diameter of the bore of the guide 15 with a sloping transition surface between the exit end of the insert 16 and the entrance end of the guide 15.

Figure 2:
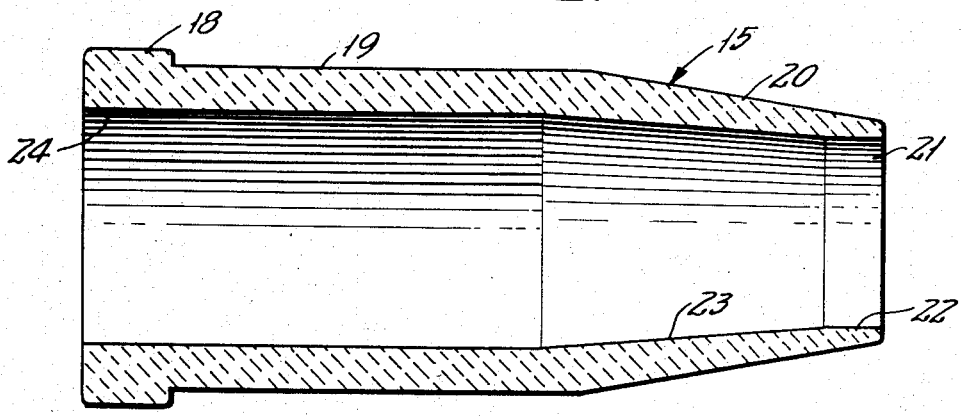
FIG. 2 is an enlarged, axial cross-section of the guide, or tip, shown in FIG. 1.

The guide 15 is shown in enlarged, axial section in FIG. 2. The opening 21 at the exit end of the guide 15 has a diameter substantially equal to, but not less than, the outer diameter of the layer 2. The opening 21 is defined by a cylindrical wall 22 which joins a frustoconical wall 23 which extends to a cylindrical inner wall 24 having a diameter larger than the outer diameter of the layer 2, e.g., a diameter of 1.5 inches if the outer diameter of the layer 2 is about 1.2 inches. The wall 22 engages and guides the layer 2 and, therefore, guides the conductor 3 with the layer 2 thereon.

The guide 15 is made of a hard material which has a thermal conductivity lower than that of steel, and which can be polished, at least at the surfaces thereof which engage the layer 2, so that it has a low coefficient of friction. A particularly suitable material is a fired ceramic material composed primarily of alumina and polished to a high degree. A guide 15 made from such a material has a thermal conductivity which is only 60% of the thermal conductivity of steel, i.e. the ceramic has a thermal conductivity of the order of 0.008–0.06 cal/(sec.cm.° C.) at 100° C., and therefore, it insulates the cooler layer 2 from the hot, polymeric material 6 which permits the material 6 to flow uniformly. When the surfaces of such a guide 15 which engage the layer 2 are polished, such as by diamond polishing of the wall 22, such surfaces have an extremely low coefficient of friction which permits the layer 2 to pass through the opening 21 without dragging forces thereon and without galling. Also, a guide 15 made from such materials is considerably harder than the steel normally used for guides, i.e. the ceramic has a hardness from 65–80 Rockwell 45n, and resists wear and scoring better than steel. Accordingly, the guide 15 does not mar or disrupt the smooth surface of the layer 2.

A fired ceramic material composed primarily of alumina ($Al_2O_3$) has been found to be highly satisfactory, but other ceramics which have equal or better properties, such as ceramics based on beryllia, carbide, ferrite, sapphire, quartz, nitrides, pure oxides, etc., and which can be polished to the necessary surface finish may also be used. The ceramic should have a surface hardness of at least 50 Rockwell, and preferably, at least 60 Rockwell. It should also have a thermal conductivity less than 0.1 and preferably, less than 0.075, (cal/sec.cm.° C.) at 100° C. The surface finish should have a surface roughness not more than 32 microinches and preferably, has a surface roughness not more than 16 microinches as defined by the ASAB 46.1, 1962 standard. Such roughness numbers represent the arithmetical average deviation of the minute surface irregularities from a hypothetical perfect surface expressed in microinches. Diamond turning produces a surface roughness of 8–16 microinches as a useful and economical range but a full commercial range is 4–32 microinches.

One source of diamond polished ceramics is Centerflex Technologies Corporation, 188 Eighth Avenue, Hawthorne, N.J. 07507.

Although polishing of the wall 22 to the desired surface finish is sufficient, it is preferred that the wall 23 also be similarly polished. If desired, the wall 24 and the surface 20 may also be similarly polished.

Figure 3:
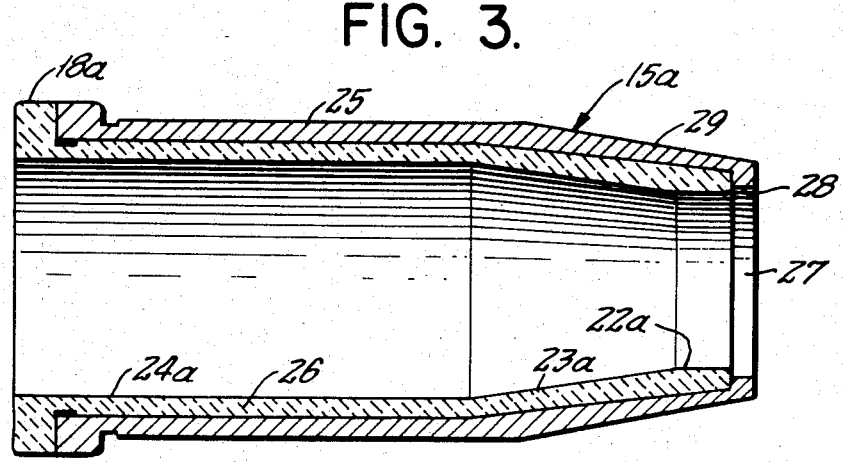
FIG. 3 is an axial cross-section of a modified embodiment of the guide, or tip, of the invention.

Since the ceramics described are susceptible to breakage when they are subjected to tensile forces but are highly resistant to compression forces, the guide 15 may be replaced by a guide 15a in two pieces as illustrated in FIG. 3. Thus, the guide 15a comprises an outer tube 25 which encircles an inner ceramic tube 26. The tube 25 may be made of stainless steel and has a close fit with the tube 26 which may be made of a ceramic material described hereinbefore. The diameters of the inner surfaces of the tube 25 which engage outer surfaces of the tube 26 may, for example, differ by about 0.005 inches.

The ceramic tube 26 has a flange 18a and walls 22a, 23a and 24a which correspond, respectively, to the flange 18 and the walls 22, 23 and 24 of the guide 15.

The tube 25 has an exit opening 27, defined by the wall 28, which is larger in diameter than the diameter of the wall 22a so that the layer 2 will not contact the tube 25. The surface 29 of the tube 25 corresponds to the surface 20 of the tube 15 and extends part way across the channel 13 so that it is contacted by the material 6 as it exits from the channel 13 into the opening 10 of the die 9 and around the layer 2. However, the material 6 is thermally insulated from the layer 2 by the tube 26 which is between such layer 2 and the tube 25.

The apparatus described is employed to apply two layers of material on a conductor in a conventional manner. Thus, the conductor 3 is advanced in the direction of the arrow 4 through the extruder 1 where a hot, semi-conductive, plastic material is extruded over the conductor 3 to form the layer 2. The distance between the extruder 1 and the extruder which contains the extrusion head 5 and the ambient conditions are so selected that when the conductor 3 with the layer 2 thereon reaches the passageway 17, the layer 2 is partially cooled. As the conductor 3 with the layer 2 thereon is advanced through the head 5, they are guided by the guide 15, or the guide 15a, by reason of contact of the wall 22, or 22a, with the layer 2. In the extrusion head 5, a layer of insulating material 11 is extruded over the layer 2 at the opening 10 in the die 9. When the conductor 3 with the top layers 2 and 11 thereon exits from the die 9, the layers 2 and 11 are allowed to cool or the conductor 3 with the two layers 2 and 11 thereon are advanced to other conventional apparatus for the application of another layer or layers of material, such as another layer of semi-conductive material and/or a sheath.

Although preferred embodiments of the present invention have been described and illustrated, it will be apparent to those skilled in the art that various modifications may be made without departing from the principles of the invention.

What is claimed is:

1. An extrusion head for the extrusion of a plastic material around a conductor of an electric cable, said head having a body with a passageway therethrough for the passage of said conductor through said body, said body having at least one channel therein extending from the exterior thereof to adjacent one end of said passageway for supplying said plastic material around said conductor, and a separate tubular guide body disposed in said passageway, having an open inner tubular bore portion for the passage of said conductor through said tubular guide body and said tubular guide having an external portion extending across part of said channel for contacting said plastic material exiting from said channel, said guide body comprising a ceramic tube with a smooth inner surface of ceramic forming said bore portion of said guide body and the ceramic of said guide body having a thermal conductivity at 100° C. of less than 0.1 cal/(sec.cm.° C.)

2. An extrusion head as set forth in claim 1 wherein said ceramic tube is a fired ceramic tube having a polished innermost surface.

3. An extrusion head as set forth in claim 2 wherein said polished innermost surface has a surface roughness of less than about 32 microinches.

4. An extrusion head as set forth in claim 3 wherein said surface roughness is less than about 16 microinches.

5. An extrusion head as set forth in claim 2 wherein said tube is made from a ceramic comprising a material selected from the group consisting of alumina, beryllia, carbide ferrite, sapphire, quartz, nitrides, oxides and mixtures thereof.

6. An extrusion head as set forth in claim 2 wherein said ceramic tube has a bore which varies in size from a larger size at the end thereof nearer the opposite end of said passageway to a smaller size at said innermost surface.

7. An extrusion head as set forth in claim 1 wherein said ceramic tube is encircled by a metal tube having its inner surface contacting the exterior surface of said ceramic tube.

8. An extrusion head as set forth in claim 7 wherein said ceramic tube has a polished innermost surface.

9. An extrusion head as set forth in claim 8 wherein said polished innermost surface has a surface roughness of less than about 32 microinches.

10. An extrusion head as set forth in claim 8 wherein said surface roughness is less than about 16 microinches.

11. An extrusion head as set forth in claim 11 wherein the ceramic of said ceramic tube is alumina and the metal of said metal tube is stainless steel.

12. Apparatus for extruding two layers of materials of different electrical properties around a conductor of an electric cable as said conductor is advanced, said apparatus comprising:

a first extruder for extruding a first layer of one of said materials around said conductor;
a second extruder spaced from said first extruder for extruding a second layer of the other of said materials around said first layer, said second extruder comprising:
an extrusion head for extruding said second layer of said other material around said first layer, said extrusion head having a body with a passageway therethrough for receiving said conductor with said first layer thereon and permitting the passage of said conductor with said first layer thereon through said body, said body also having at least one channel therein extending to adjacent one end of said passageway for supplying said second material around said first layer and said body further comprising a separate tubular guide having an exterior surface, said tubular guide comprising a tube of ceramic material with an open inner tubular bore disposed in said passageway for engaging, with an inner ceramic surface thereof, said first layer and guiding said conductor with said first layer thereon, and a portion of the exterior surface of said guide extending across part of said channel for contacting said second material as it exits from said channel, and said inner ceramic surface being a smooth surface and the ceramic of said guide having a thermal conductivity at 100° C. of less than 0.1 cal/(sec.cm.° C.).

13. Apparatus as set forth in claim 12 wherein said inner surface has a surface roughness of less than about 32 microinches.

14. Apparatus as set forth in claim 12 wherein said inner surface has a surface roughness of less than about 16 microinches.

15. Apparatus as set forth in claim 12 wherein said ceramic tube is encircled by a metal tube with the inner surface thereof contacting the exterior surface of said ceramic tube.

16. Apparatus as set forth in claim 15 wherein said inner surface has a surface roughness of less than about 32 microinches.

17. Apparatus as set forth in claim 16 wherein the smallest inner diameter of said metal tube is larger than the diameter of said inner surface of said tubular guide.

18. An extrusion head for the extrusion of a plastic material around a conductor of an electric cable, said head having a body with a passageway therethrough for the passage of said conductor through said body, said body having at least one channel therein extending from the exterior thereof to adjacent one end of said passageway for supplying said plastic material around said conductor, and a tubular guide disposed in said passageway having an inner tubular bore portion for guiding said conductor, said tubular guide having an external portion extending across part of said channel for contacting material exiting from said channel, said tubular guide comprising a ceramic tube having an inner surface hardness of at least 50 Rockwell 45n, a thermal conductivity at 100° C. of less than about 0.075 cal/(sec.cm° C.) and a surface roughness of less than 32 microinches.

* * * * *